United States Patent
Spann

(10) Patent No.: US 6,491,361 B1
(45) Date of Patent: Dec. 10, 2002

(54) DIGITAL MEDIA CUTTER

(75) Inventor: Donald E. Spann, San Diego, CA (US)

(73) Assignee: Encad, Inc., San Diego, CA (US)

( * ) Notice: Subject to any disclaimer, the term of this patent is extended or adjusted under 35 U.S.C. 154(b) by 12 days.

(21) Appl. No.: 09/711,174

(22) Filed: Nov. 9, 2000

Related U.S. Application Data

(60) Provisional application No. 60/331,344, filed on Nov. 9, 2000.

(51) Int. Cl.[7] .............................. B41J 2/01; G06K 1/20
(52) U.S. Cl. ...................... 347/2; 347/104; 219/121.67; 234/37
(58) Field of Search ........................... 347/2, 101, 102, 347/104, 107; 219/121.67, 121.68, 121.69, 121.7, 121.71, 121.72; 26/7; 234/35, 36, 37

(56) References Cited

U.S. PATENT DOCUMENTS

| | | | |
|---|---|---|---|
| 3,761,675 A | * | 9/1973 | Mason et al. .......... 219/121.67 |
| 5,130,726 A | * | 7/1992 | Fukushima et al. .......... 347/102 |
| 5,614,115 A | * | 3/1997 | Horton et al. .......... 219/121.67 |
| 5,650,076 A | | 7/1997 | Ben-David ................ 219/121.7 |
| 5,656,109 A | * | 8/1997 | Schilling et al. ............... 156/63 |
| 5,838,354 A | * | 11/1998 | Yamada et al. ............. 347/101 |
| 5,943,067 A | * | 8/1999 | Kong ............................. 347/2 |
| 6,145,979 A | * | 11/2000 | Caiger et al. ............... 347/102 |
| 6,173,211 B1 | * | 1/2001 | Williams et al. ............ 700/131 |

FOREIGN PATENT DOCUMENTS

| EP | 0 950 752 A | | 10/1999 | |
| JP | 5278237 A | * | 10/1993 | .............. B41J/2/32 |

* cited by examiner

Primary Examiner—John Barlow
Assistant Examiner—Blaise Mouttet
(74) Attorney, Agent, or Firm—Jeffrey S. Ellsworth; Milton S. Sales

(57) ABSTRACT

A printer includes a rasterized laser illumination system. The printer may be an ink jet type and the application of laser light may be controlled digitally along with the ink droplet ejection. The media may be cut or etched with the laser, or heat may be applied to previously deposited ink.

22 Claims, 5 Drawing Sheets

DIGITAL MEDIA CUTTER

CROSS REFERENCE TO RELATED APPLICATIONS

This application claims priority to prior U.S. patent application Ser. No. 09/436,877, entitled "DIGITAL MEDIA CUTTER," which was filed on Nov. 9, 1999, and which was converted to Provisional Application No. 60/331,334 on Nov. 9, 2000.

BACKGROUND

Digital dot matrix printers such as ink jet printers are used in a wide variety of applications other than printing documents, posters, and the like onto standard rectangular print media. In many cases, the desired end product will not be rectangular. For instance, printed adhesive backed vinyl alphanumeric characters, logos, etc. for signs or other commercial displays may have a variety of shapes. Garment production also requires a variety of shapes of printed fabric pieces to be created.

Generally, when such unusual or custom shapes are desired, a rectangular sheet or roll of media is printed with the desired color or pattern. This media may be paper, paper backed vinyl, textile, or other material. Following the printing process, the material is placed onto a separate cutter for cutting the desired shapes out of the printed media. This type of cutting machine is basically a plotter with a knife substituted for a pen. A carriage moves the knife in one dimension while a media handling mechanism moves the media in the other dimension. Some devices move the knife in two dimensions and hold the media stationary.

These techniques require two separate operations on different devices. In addition, care must be taken in many instances to ensure that the cutting is in proper registration with the previously performed printing. Although a laser plotter which includes a laser cutting system is described in U.S. Pat. No. 5,650,076 to Ben-David, this device is only operative to cut registration holes in the sides of the media for subsequent printing operations. Furthermore, printing and cutting are performed sequentially, which still requires additional time.

More effective methods and systems to perform both printing and cutting operations are therefore needed in the art.

SUMMARY

Some preferred embodiments of the present invention comprise printing and cutting methods and apparatus which reduce the time and labor required to produce pieces of printed media of pre-defined shape. These embodiments of the invention have especially advantageous application to the fields of sign making and garment prototyping. To enhance the efficiency of such processes, in one embodiment, the invention comprises a method of producing a printed product having a predefined boundary comprising cutting along the boundary during the process of depositing ink within or outside the boundary.

A rasterized laser may be used to perform this cutting. This embodiment is advantageous in combination with rasterized printing because common digital control may be used for both printing and cutting. In some embodiments of the invention, the laser may be used for purposes other than cutting. Thus, in another embodiment of the invention, a method of producing a printed piece of media comprises ejecting a droplet of ink onto a first pixel location on the media; and at substantially the same time, illuminating a second pixel location on the media with laser light. The laser illumination may be used for a wide variety of purposes. For example, the illumination intensity may be selected so as to form holes in the media, or alternatively to etch the media surface without forming holes. In other embodiments of the invention, the intensity may be selected to sublimate dyes or enhance the drying of ink previously deposited on the media.

Embodiments of the invention further include ink jet printers. In one embodiment, such an ink jet printer includes a printing surface, one or more print heads, a laser light source; and a digital controller coupled to the print head and to the laser light source. Under the control of the controller, both colorant and illumination from the laser light source are provided to one or more programmably selected raster locations on the printing surface.

DETAILED DESCRIPTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
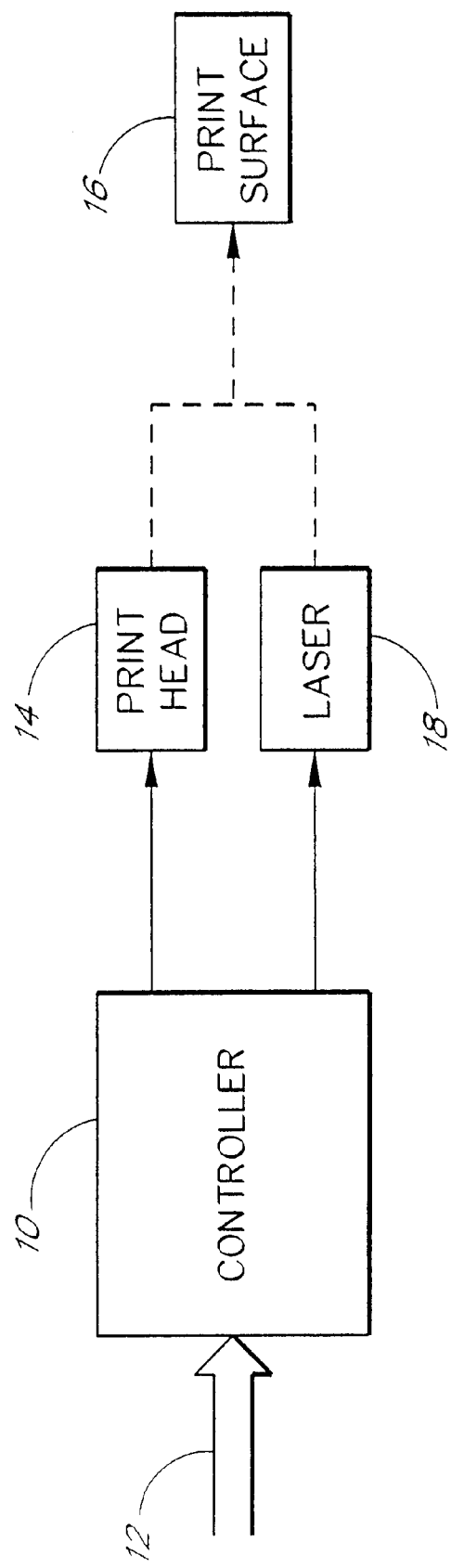
FIG. 1 is a block diagram of a printer in accordance with one embodiment of the invention.

Referring now to FIG. 1, in one embodiment of the invention, a printer incorporates both printing capabilities and media cutting capabilities. The printer advantageously includes a controller 10 which receives digital data 12 from an external source such as a personal computer, local area network, or the like. As is well known in the art, the controller 10 will typically comprise a digital microprocessor or microcontroller. By controlling a print head 14 with the controller 10, the printer affixes colorant to a print surface 16. The print head 14 may apply a colorant such as ink directly. Other alternatives include applying heat or forming a local electrical charge on selected areas of the print surface. A wide variety of print heads may be used in conjunction with the present invention.

In one advantageous embodiment of the invention, the printer is an ink jet printer, and the digital data 12 defines pixel locations onto which ink droplets should be placed to produce a desired image or pattern. This data may be formatted in a wide variety of industry standard formats which are well understood by those of skill in the art. Using this digital data 12, the controller 10 controls ink deposition from one or more print heads 14 which passes over a print surface 16 to produce the image.

The printer also includes a laser 18. The application of laser light to the print surface 16 is also controlled by the controller 10. Preferably, the application of laser light and the application of ink from the print head 14 are substantially simultaneously performed. In some embodiments of the invention, this will allow cutting and printing to be performed during a common operation, thereby saving considerable time in producing a printed and cut end product. In one embodiment, the application of laser light may comprise the application of pulses of laser light which ablate the media at selected pixel locations. In this embodiment, a cutting process is advantageously rasterized as well as the printing process. The digital data 12 may therefore define not only pixel locations which are to receive ink droplets, but also pixel locations which are to receive one or more pulses of laser light. For media cutting applications, with the appropriate definition of pixel locations to be ablated with the laser, a substantially continuous line of joined holes may be formed in the media, defining the boundary of the desired cut shape.

It will be appreciated that the resolution of the printing and cutting process need not be identical. Printing resolution will typically be in the range of 150 to 600 dots per inch (dpi). Current raster laser technology can produce a laser beam resolution of up to 1440 dpi, although 1200 dpi is likely the highest resolution required for the ink jet printing and cutting application described herein. In many applications, a lower resolution cutting process in the range of 50 to 150 dpi may be performed with visually satisfactory results. Of course, the invention is applicable to systems of any resolution for both printing and cutting, whether equal to one another or different.

The printer of FIG. 1 may include a movable carriage which scans across the media in one dimension and a media transport mechanism that increments the media in the second dimension to print successive swaths of ink droplets so as to form the desired image. In this embodiment, an optical system may reside on the carriage so that the raster cutting operation may be performed during the same media scans which are used for ink droplet deposition. One embodiment of such a printer is illustrated in FIG. 2.

Figure 2:
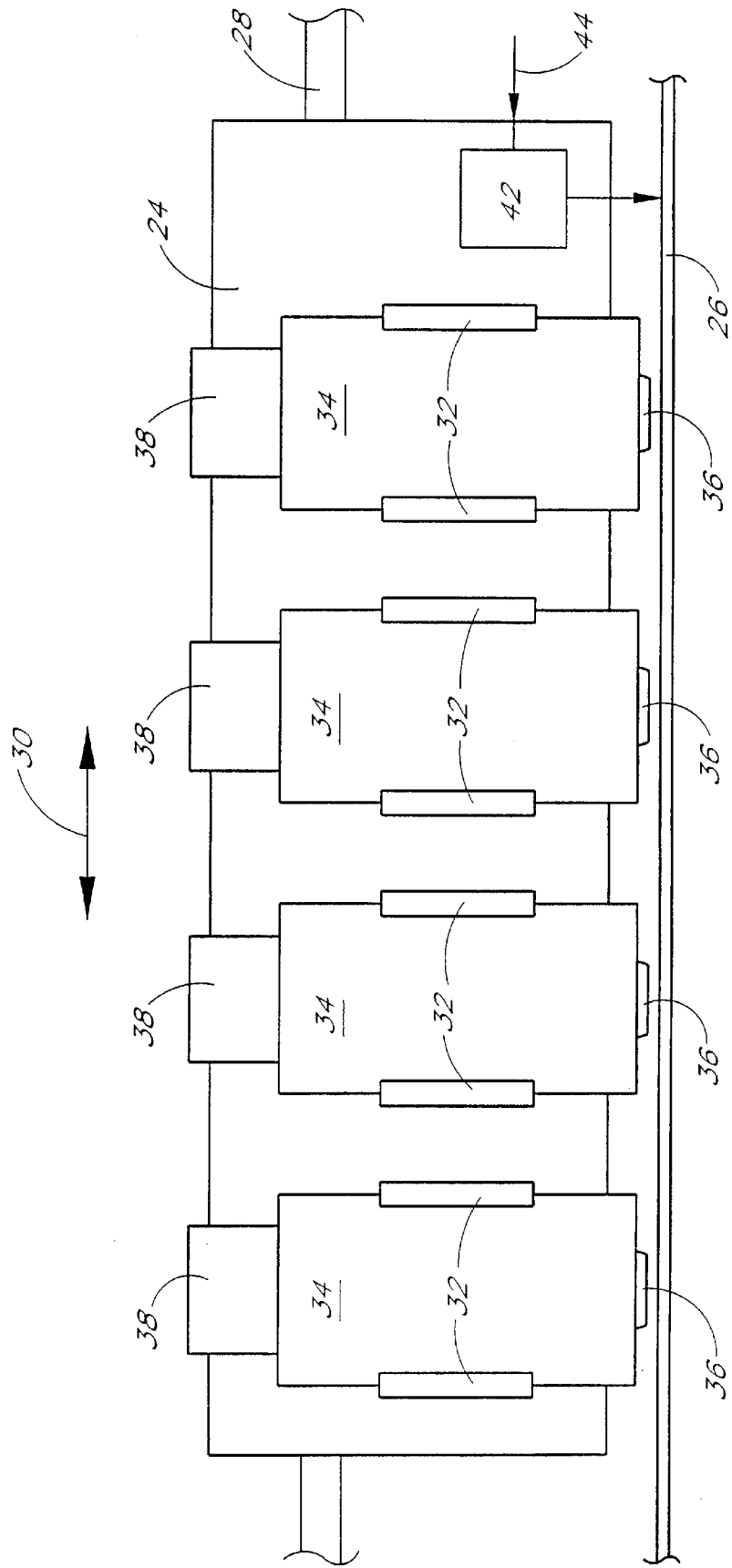
FIG. 2 is a front view of a printer incorporating a stationary laser light source and ink jet print heads mounted to a movable print carriage.

As illustrated in FIG. 2, a print carriage according to one embodiment of the invention comprises a frame 24 which is suspended over the surface of a piece of media 26 on one or more guide rods 28. The carriage frame 24 moves back and forth over the media 26 in the direction of arrow 30. Between carriage passes, the media 26 is advanced in the perpendicular direction into or out of the plane of the Figure.

Mounted to the frame 24 are ink jet cartridges 34 which may be affixed to the carriage with snap-fit tabs 32. In the embodiment of FIG. 2, four cartridges are illustrated. This is common for color ink jet printing, with the cartridges 34 printing cyan, magenta, yellow, and black ink respectively. It will be appreciated that a wide variety of cartridge types and numbers may be provided, and that the invention is applicable to any printing system.

The ink jet cartridges 34 include jet plates 36 on their bottom surface which selectively deposit ink droplets onto pixel locations on the media 26. The jet plates 36 typically comprise one or more columns of ink ejection nozzles which are spaced to define a print resolution in the direction of media travel. In many applications, the jet plates will perform on-demand ink droplet ejection which is actuated thermally or piezoelectrically. The carriage also includes an electronic interface for each cartridge 34, which may comprise flex circuits 38 that route electrical signals from the controller 10 (FIG. 1) provided in the printer out to the cartridges 34 for control of the jet plates 36.

During normal printing operations, as the carriage passes over the surface of the media, droplets of ink are selectively ejected from each of the jet plates 36 onto desired pixel locations in a strip or swath of parallel raster lines, wherein the strip laid down by each jet plate has a length equal to the length of the jet plate nozzle column. In color printers, having a separate jet plate for each color ink, these strips may be completely overlapping, partially overlapping, or completely non-overlapping. In a "single pass" print mode, the media is then be incremented in a direction perpendicular to the direction of carriage travel by an amount equal to the length of the jet plate nozzle columns, and the carriage makes another pass across the media 26, with each jet plate 36 depositing ink droplets at desired pixel locations in the adjacent strip of parallel raster lines. In "multi-pass" printing techniques, two or more nozzles may be used to print onto the pixels of a given raster line over the course of a series of passes by the carriage 24. In these embodiments, the media may be incremented following each pass by an amount that is less than the length of the jet plate nozzle columns. In a four pass print mode, for example, the media 26 may be incremented by ¼ of the length of the jet plate nozzle column after each pass.

These aspects of ink jet printers are well known and conventional, and a wide variety of well known alternative print protocols and printer constructions exist, any of which will be applicable to the present invention. The specific construction illustrated herein provides one example of an advantageous application of the invention.

Figure 3:
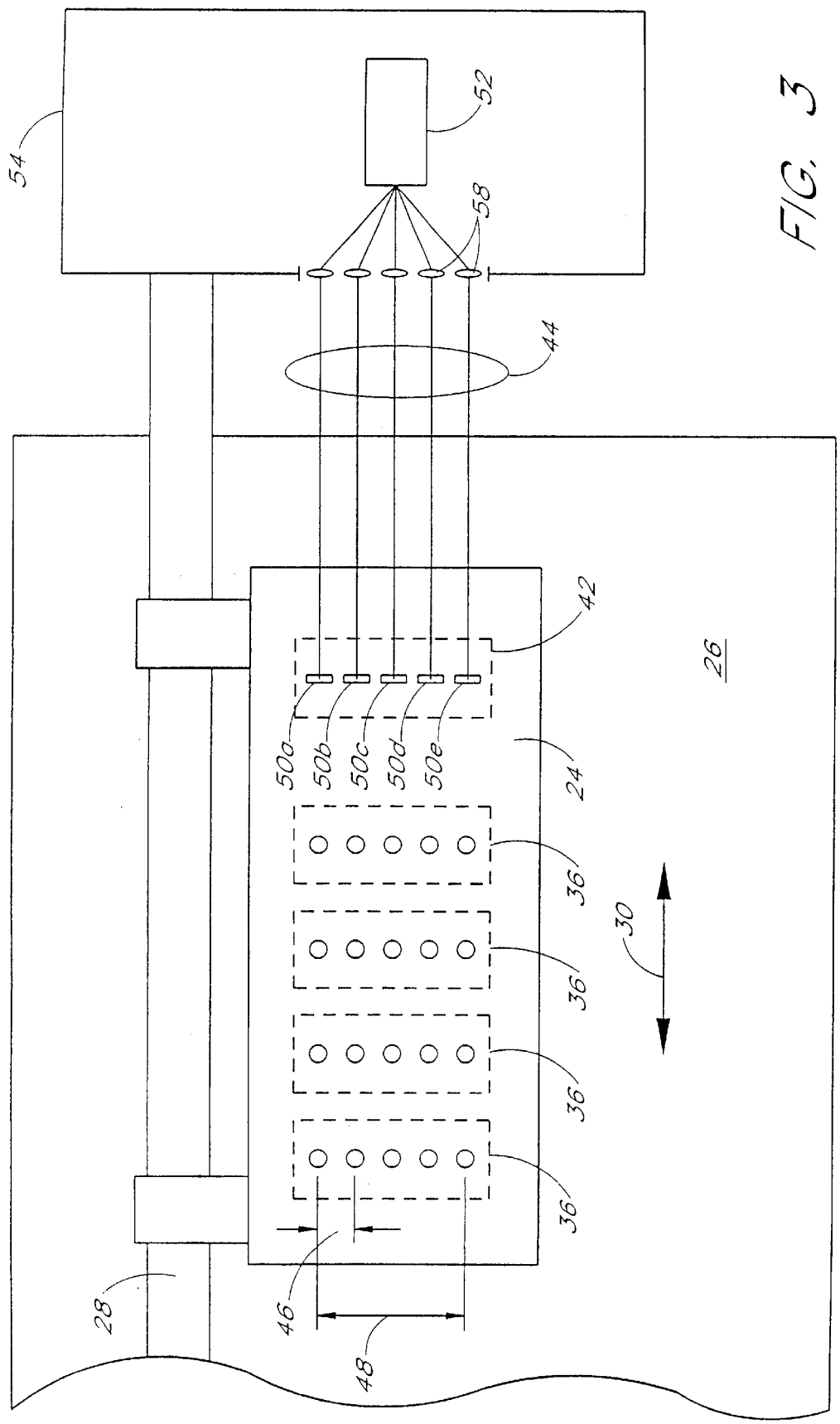
FIG. 3 is a top view of the printer of FIG. 2.
Figure 4:
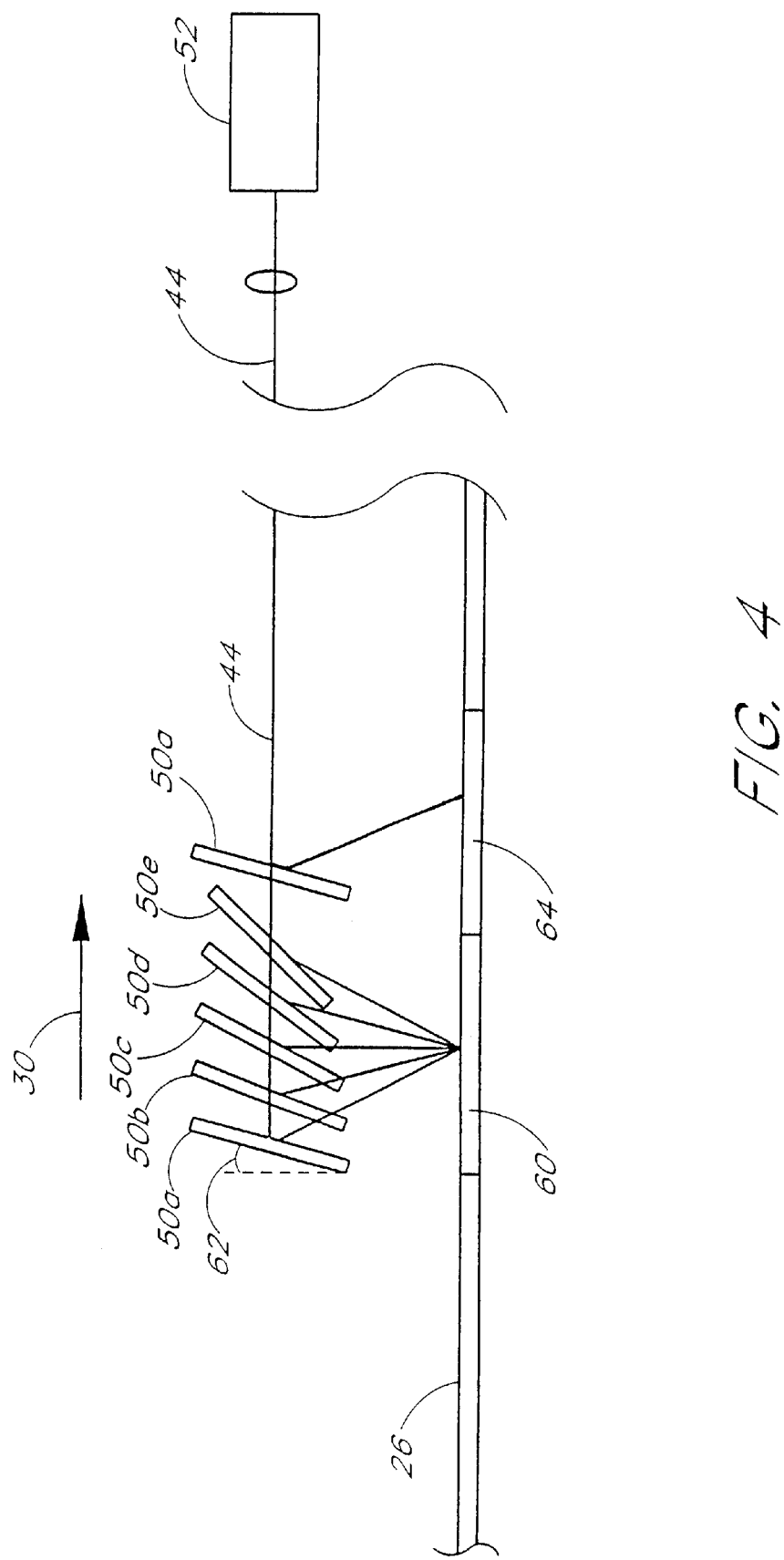
FIG. 4 is a front view of one embodiment of an optical system mounted to the carriage of FIGS. 2 and 3.

In the embodiment of the invention illustrated in FIGS. 2–4, the carriage frame 24 also provides a mounting location for an optical system 42. The optical system 42 receives one or more laser beams 44 from a laser light source. In some embodiments, the laser light source may be mounted to the printer at a location external to the carriage. This is the embodiment illustrated in FIG. 2. However, instead of being mounted on the printer external to the moving carriage, the laser light source could alternatively be mounted on the carriage frame 24, making the laser light source itself also part of the optical system 42. This may simplify some components of the optical system 42, but currently the size and weight of commercially available laser light sources makes the stationary, printer housing mounted laser generally preferable.

The optical system 42 may include one or several mirrors to direct the laser light downward toward the media. Beam focusing optics such as lenses may also be provided in the optical system 42. The laser light source may comprise a laser diode, a $CO_2$ laser, or any laser light source with sufficient power to form holes in print media such as paper, vinyl, or textiles. As will be described further with reference to FIGS. 3 and 4, the laser light beam(s) 44 and optical system 42 are advantageously configured to selectively apply spots of laser light to a strip of pixel columns as the print carriage 24 passes over the media. The optical system 42 may therefore be considered to form a "nozzle plate" which is analogous to the jet plates 36, but which applies laser light to the media rather than ink droplets during the print process.

With the printer embodiment of FIG. 2, the laser light may be used for several purposes. As described above, the laser may be used to form holes in the media at selected pixel locations. To produce a piece of printed media having a pre-defined shape, the pixel locations which receive bursts of laser light may be selected to join and form a substantially continuous cut boundary having the pre-defined desired shape. This procedure is especially applicable to the essentially simultaneous printing and cutting of garment patterns quickly and with minimal media waste, as is explained further below with reference to FIG. 5. It is also possible to select separated pixels or pixel groups to apply laser bursts to, so as to perforate the desired boundary, rather than have the holes actually overlap and join.

Beam intensity may be controlled to provide further applications of the invention in addition to those involving actually cutting the media during printing. For example, alphanumeric symbols for signs are often manufactured by ink jet printing block letters onto a paper backed vinyl or other plastic substrate. When the symbols are later cut, the cuts are made through the vinyl, but not through the paper backing. When excess vinyl around the symbols is peeled away from the paper backing, some portions of excess vinyl remain, such as in the middle of a letter "O", "A", or number "4", for example. Removing these small and unconnected portions of excess vinyl is referred to as weeding. This separate weeding process may be avoided in some advantageous implementations of the invention. By controlling laser intensity as a function of pixel position, one set of holes can be formed through both the vinyl and paper, while another set of holes can be made only through the vinyl, leaving the paper backing underneath substantially intact. In this embodiment, therefore, the weeding process is performed automatically without a separate operation.

In another application, the laser can be used to etch or texture the surface of the media prior to the application of ink to the etched/textured surface. In this embodiment, beam intensity is selected which ablates the surface of the media, but which does not form a hole through it.

Additional applications involving the application of heat to the media without actually forming holes are contemplated. For instance, during ink jet printing operations, it is generally advantageous for the ink to be dry as soon as possible after deposition because adjacent deposited droplets have a tendency to coalesce if still wet, reducing print quality. This problem is often addressed by reducing print speed and/or using multi-pass printing techniques which reduce the occurrence of adjacent wet ink droplets. With the application of laser light to heat the just deposited wet ink droplets during carriage passes, it is possible to speed the drying process, thus allowing the use of a faster carriage speed and/or fewer passes without a reduction in print quality associated with wet ink coalescence.

Furthermore, with some ink/media combinations, most commonly textiles, the desired pattern is first printed onto a paper substrate. In a separate operation, the textile media will be placed in contact with the printed paper. The textile/paper combination is then heated to sublimate the dye and affix the color to the textile. In embodiments of the present invention, the desired pattern can be printed directly onto the desired textile substrate, and an appropriate amount of laser light can be applied Lo heat the deposited ink. In this embodiment, the heating can be done during the print process, eliminating a separate dye sublimation step.

As mentioned briefly above, the laser light and optical system are configured to direct light onto columns of pixels as the carriage 24 passes over the media. This configuration is illustrated in the ink jet printer top view of FIG. 3. For clarity of illustration, the nozzle plates 36 of the cartridges are illustrated without the cartridge body. Each nozzle plate comprises a column of five nozzles. Only five nozzles are shown for each jet plate 36 for clarity. However, it will be appreciated by those in the art that ink jet printer jet plates will typically include a column of 30–300 or more nozzles.

In addition, although the nozzles are shown as a single vertical column in FIG. 3, the nozzles will often be divided into two or more horizontally spaced sub-columns due to cross-talk, power draw, and heat dissipation concerns which are not pertinent to the present invention. Vertical nozzle spacing 46 defines print resolution in the vertical direction, and the nozzle column length 48 defines the width of the swath deposited by the jet plate during a horizontal pass of the carriage 24 across the media in the direction of arrow 30.

Also mounted on the carriage is the optical system 42, which in this embodiment comprises a set of five angled mirrors 50a–50e. The mirrors are positioned in a column which is aligned with the nozzle columns 36 also supported on the carriage, with each mirror corresponding to a pixel location in the column of five pixel locations. Laser light beams 44 are selectively directed to the mirrors, and are directed downward to the media to heat or cut the media at selected pixel locations. The source of laser light may be a laser 52 which is mounted in an end housing 54 of the printer.

In some embodiments, a separate laser may be provided for each mirror. In this case, an array of laser tubes may be mounted adjacent to one another in the end housing to form a corresponding array of adjacent and parallel output laser beams. These types of parallel laser arrays are used in the packaging industry to mark boxes and other containers. If separate lasers for each pixel in the pixel column are provided, it is possible to apply laser heating to several or all of the pixels of the column simultaneously by firing the desired set of lasers simultaneously.

In other embodiments, it is advantageous to provide a single laser source which has a controllable beam direction so as to apply bursts of laser light to appropriate pixel locations in a serial fashion. There are at least three ways to control the direction of a laser beam in commercial practice today. One method comprises reflecting the laser light off of a rotating polygon. This technique is used in many commercially available bar code scanners. Another method, used in some container marking applications, comprises reflecting the laser light off of one or more steerable mirrors. Yet another approach is to change beam direction acousto-optically. With this type of system, a piezoelectric crystal is used to set up a standing acoustic wave in a refracting medium. Laser light is redirected by refraction off of the standing wave.

Regardless of the technique used, the output of the laser 52 may be directed out at a variety of angles. These beams may be aligned into appropriately spaced parallel beams 44 by prisms, lenses, or other optical elements 58 provided in the housing 54. The optics used to alter beam direction such as the rotating polygon, acousto-optic cell, or other device is illustrated in FIG. 3 as being incorporated into the laser system 52. It will be appreciated; however, that such beam directing components could alternatively be mounted on the carriage 24.

In the directed, single output laser beam embodiment, only one pixel location will be addressed by the beam at any given moment. If, for example, a vertical cut in the media 26 is to be made, all of the pixel locations in a vertical column will need to be addressed by the laser beam sequentially as the carriage mounted optical system 42 passes over that pixel column. During printing, the optical system 42 will be moving toward or away from the laser 52 so as to be in a different position over the pixel column for each application of laser light to a selected mirror 50a–50e. The optical system 42 may be designed to account for this in a variety of ways, one of which is illustrated in FIG. 4.

In this Figure, the mirrors 50a–50e of the optical system 42 are mounted on the carriage 24 so as to be aligned with vertical pixel columns as shown in the top view of FIG. 3. However, five sequential positions of the optical system are shown as the carriage 24 moves rightward in FIG. 4 toward the laser 52 in the direction of arrow 30. As the optical system 42 passes over the width of a pixel column, designated 60 in FIG. 4, laser beams are directed sequentially to the five mirrors 50a–50e.

To account for the different positions of the mirror array as the carriage passes the pixel column, the mirrors may be angled differently to direct the beam downward toward the media 26 in different directions. As the optical system first becomes positioned over the pixel column, laser light is directed to the top mirror 50a, which is mounted at an angle 62 which is less than 45 degrees from vertical. This directs the laser light slightly forward and ahead of the carriage position, to the center of the pixel column being passed. Next, the laser beam is directed to the second mirror 50b. Because the carriage has moved rightward slightly, this mirror 50b is mounted at a larger angle from the vertical such that the laser beam reflected from the second mirror 50b is also directed toward the center of the pixel column being passed. The mirrors 50c–50e are mounted at progressively larger angles from vertical such that as the laser light beams are sequentially applied to the mirrors, the light is always directed toward the center of the pixel column. As the carriage continues its pass over the media in the direction of arrow 30, the first mirror 50a becomes properly positioned over the next pixel column 64, an the laser light can be directed toward the first mirror 50a again if this pixel location has been selected to receive laser light.

A variety of alternatives exist for mounting the mirrors of the optical system 42 such that a column of pixel locations can be addressed as the carriage 24 moves across the media. For example, the mirrors may be mounted at the same angle, but may be staggered horizontally in the direction of carriage motion such that as the carriage passes over a pixel column, the different mirrors are sequentially positioned over its center. In this embodiment, sequential application of laser light is timed to coincide with the sequential centering of the mirrors over the pixel column. In this embodiment and the embodiment of FIG. 4, the laser dwell time must be less than the amount of time it takes the carriage to move one pixel column divided by the number of mirrors. The potential dwell time may be increased by breaking the mirror column up into two or more separated columns and providing a separate laser for addressing each separate mirror column. Multi-pass laser cutting modes could also be provided. In one possible multi-pass cutting mode, only a defined subset of the mirrors are addressed by the laser with each one of the multiple passes. In another possible embodiment, all of the mirrors may be addressed, but at a lower duty cycle than would be the case in a single pass mode. In fact, any of the wide variety of multi-pass printing techniques currently known and used in ink deposition applications could be applied to the application of laser light to selected raster locations.

In the embodiment illustrated in FIGS. 3 and 4, the mirror array is the same length 46 as each ink jet nozzle column. This structure allows cutting to take place during the same carriage passes as are used to perform the printing. It will be appreciated by those of skill in the art, however, that the mirror array need not be aligned with any of the jet plates 36, and could be only partially overlapping, or non-overlapping, in analogy with partially and non-overlapping jet plates well known and used on commercial ink jet printers.

For ink drying applications, the array of mirrors should span the entire swath width of all of the jet plates 36. For completely overlapping nozzle plates as shown in FIG. 3, this is accomplished by the mirror array of length equal to each nozzle column. For partially or non-overlapping jet plate printer, however, the mirror array would be longer than the individual jet plates so as to be able to apply heat for ink drying to the entire swath width as it is printed. It will also be appreciated that for ink drying applications in bi-directional printing, laser light will need to be available on both sides of the carriage 24. This can be accomplished by including additional beam directing optics on the carriage for routing the light to the other side, or alternatively, a second laser could be mounted in the opposite end housing and operated as described above during carriage motion in the appropriate direction.

The preferred embodiments of the invention which are described above save considerable time and effort when producing cut printed products because the printing and cutting processes are performed at the same time. While the jet plates 36 are ejecting ink onto one or a set of pixel locations, the laser cutting system may be simultaneously illuminating one or a second set of pixels to form holes to cut out the desired shape. Thus, a printed and cut design may be progressively formed on the media with sequential passes of the ink ejection nozzles and the laser light such that the desired pattern or image is deposited and the cut holes join to produce a substantially continuous cut boundary of the desired shape. A printed product with a predefined boundary may thus be produced by cutting along the boundary during the process of ink deposition. The cutting process is advantageously rasterized and controlled digitally by the same microprocessor or microcontroller that controls ink ejection during the print process.

Several advantageous applications of a combined rasterized printer and media cutter are possible. For example, many signs are made by printing a color or pattern onto paper backed vinyl sheets and then cutting out letters from the printed sheets and placing them onto a substrate of a different color or pattern. With the above described printing and cutting system, the laser may be focused to cut through the vinyl but not the paper backing, and the sign letters can be cut as they are printed, eliminating the need for a separate vinyl cutting operation.

In another application of the invention, garment prototyping can be made significantly more efficient. Currently, garment prototyping involves printing one or several rolls of material with the desired pattern. Appropriately shaped pieces called for by the garment pattern are then cut from the rolls of printed fabric, and the unused printed fabric is discarded.

Figure 5:
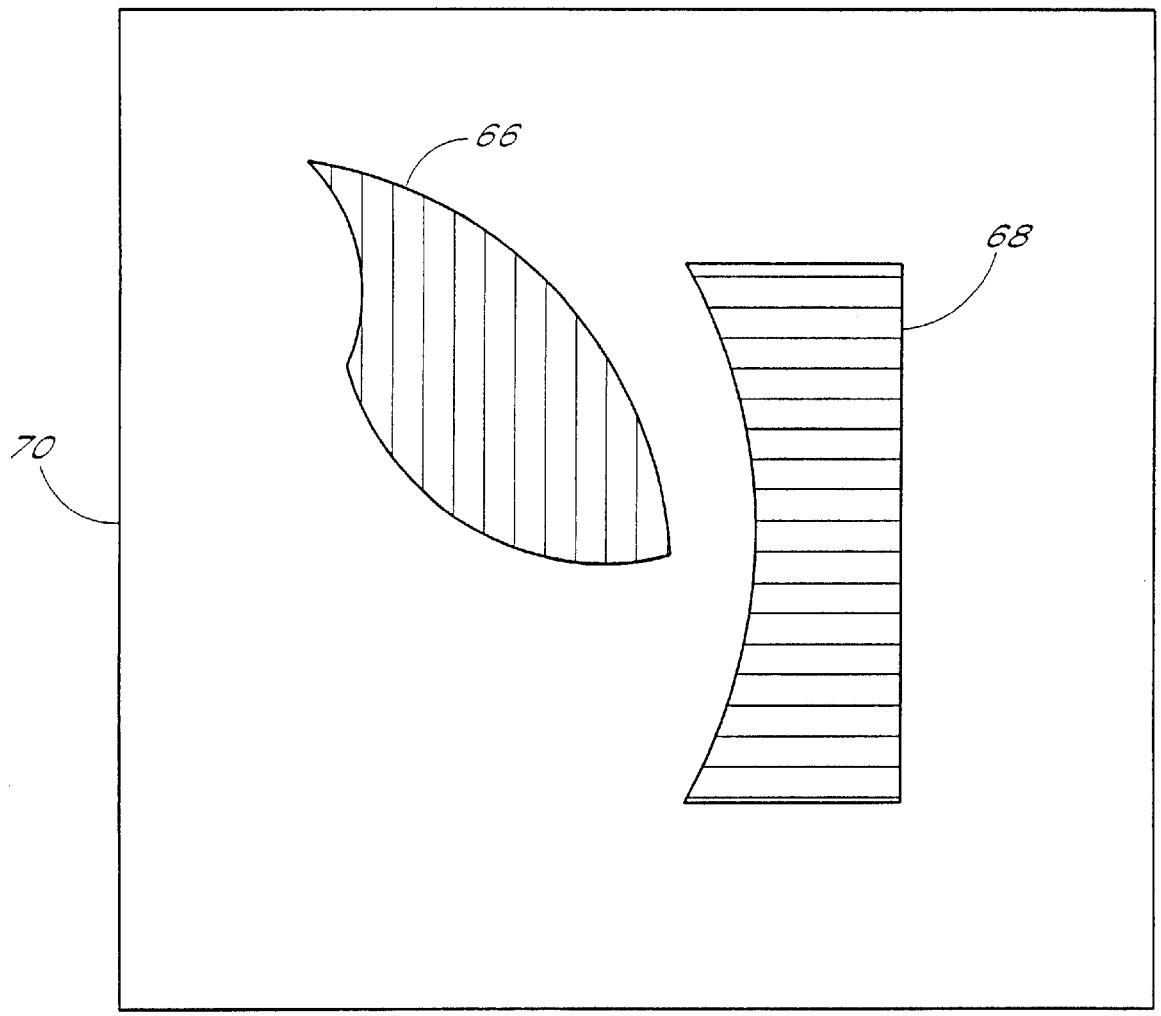
FIG. 5 illustrates a print pattern printed on textile in accordance with one embodiment of the invention.

With reference now to FIG. 5, a more efficient process utilizing a combined printer/cutter constructed according to one embodiment of the invention would involve simultaneously printing and cutting only the desired pieces for the garment, rather than cutting them from pre-printed fabric. With this method, a designer may use conventional design software to nest appropriate garment pieces 66, 68 called for by the garment pattern onto a blank sheet 70. This nesting process may take into account the direction of the fabric weave. The designer may orient the print inside the nested garment pieces 66, 68 in any configuration desired. In FIG. 5, for example, a striped pattern is illustrated which is oriented vertically within one piece 66, and oriented horizontally within another piece 68. The designed sheet of fabric 70 is then printed by ink droplet deposition, and the pieces 66, 68 are simultaneously cut out of the sheet 70 with the laser cutter. With this method, no ink is wasted on the parts of the fabric which are going to be discarded. In addition, the pattern is ready for sewing much more quickly than possible with conventional preparation methods.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method for substantially simultaneously printing and cutting pieces of ink jet printed media which have a pre-defined shape, said method comprising:

passing ink ejection nozzles of an ink jet printer across a portion of a print surface so as to selectively eject droplets of ink onto a first set of pixel locations on said print surface;

concurrently directing laser light onto a second set of pixel locations on said portion of said print surface so as to selectively form one or more holes in said piece of media at a second set of pixel locations; and repeating the steps of passing ink ejection nozzles and concurrently directing laser light such that a printed design is progressively formed on said media with sequential passes of said ink ejection nozzles and such that said holes join to produce a substantially continuous cut boundary circumscribing said pre-defined shape, whereby a printed product having said pre-defined shape is separated from the remainder of said media during the printing process.

2. An ink jet printer comprising:
   a printing surface;
   one or more print heads;
   a cutting laser light source configured to form holes in media mounted on the printing surface;
   a movable print carriage, wherein said one or more print heads and an optical system for guiding illumination received from said laser light source are mounted on said print carriage; and
   a digital controller coupled to said one or more print heads and to the optical system, whereby both colorant is provided and holes are cut to one or more programmably selected raster locations during a combined printing and cutting process.

3. The ink jet printer of claim 2, wherein ink jet nozzles on said one or more print heads are thermally or piezoelectrically actuated.

4. The printer of claim 2, wherein said digital controller comprises a microprocessor or microcontroller.

5. A method of producing a selected printed product having a predefined shape, said method comprising depositing ink onto said selected printed product within or outside the boundary of said shape with at least one print head mounted on a print carriage while at the same time cutting said selected printed product along said boundary of said shape with laser light directed from an optical system mounted on said print carriage.

6. The method of claim 5, wherein both said depositing ink and said cutting are rasterized operations.

7. The method of claim 6, wherein said cutting is performed with a laser.

8. A method of producing printed textiles for a garment comprising:

nesting a plurality of bounded shapes defined by a garment pattern on a textile substrate;

printing a design within said bounded shapes with sequential passes of one or more ink jet print heads mounted to a moving print carriage; and cutting said bounded shapes from said textile substrate with a laser cutter mounted to said moving print carriage during the same sequential passes such that printing said design and cutting said shapes are performed substantially simultaneously.

9. A method of making an ink jet printer comprising coupling both ink ejection nozzles and an optical system to a movable print carriage;

positioning said movable print carriage adjacent to a print surface; and coupling a digital processor to said ink ejection nozzles and said optical system such that said optical system and said ink ejection nozzles are simultaneously operated and controlled by said digital processor to both cut and print during the same scans of said print carriage over said print surface.

10. A method of producing a printed piece of media comprising:

ejecting a droplet of ink onto a first pixel location on said media with at least one print head mounted on a movable print carriage; and substantially simultaneously with said ejecting, cutting a hole at a second pixel location on said media with laser light directed from an optical system mounted on said print carriage.

11. The method of claim 10, comprising simultaneously ejecting a plurality of individual droplets of ink onto a corresponding first plurality of pixel locations.

12. The method of claim 11, comprising simultaneously cutting a hole at a second plurality of pixel locations with laser light.

13. The method of claim 10, wherein said media is attached to a backing, and wherein said hole extends through both said media and said backing.

14. A printer comprising:
    a printing surface;
    one or more print heads;
    a laser light source having an intensity sufficient to cut print media;
    an optical system configured to guide laser light from said laser light source onto the printing surface; and
    a movable print carriage having said one or more print heads and said optical system mounted thereon, and
    a controller coupled to said print heads and said optical system such that a printed design is progressively formed and separated from a remainder of the media with sequential passes of said movable print carriage over said print media.

15. The printer of claim 14, wherein the laser light source is mounted on the print carriage.

16. The printer of claim 14, wherein the laser light source is mounted off of the print carriage.

17. The printer of claim 14, wherein said print heads comprise ink jet nozzles which are thermally or piezoelectrically actuated.

18. The printer of claim 14, wherein said optical system comprises a plurality of mirrors.

19. A printer comprising:

a printing surface comprising a print media;

means for producing laser illumination for cutting said print media;

a movable print carriage comprising both means for ejecting ink droplets onto said print media so as to progressively form a printed image, and means for guiding said laser illumination;

a digital controller coupled to said means for ejecting ink droplets and said means for guiding said laser illumination so as to progressively produce a substantially continuous cut boundary circumscribing said printed image and thereby separate said image on the printed media from a remaining portion of said media during the printing process.

20. The printer of claim 19, wherein means for ejecting ink droplets comprises ink jet nozzles which are thermally or piezoelectrically actuated.

21. The printer of claim 19, wherein said means for guiding said laser light comprises a plurality of mirrors.

22. A method for substantially simultaneously printing and cutting pieces of ink jet printed media, said method comprising:

coupling both ink ejection nozzles and an optical system to a movable print carriage;

passing said ink ejection nozzles across a portion of a print surface so as to selectively eject droplets of ink onto a first set of pixel locations on said print surface;

directing laser light with said optical system onto a second set of pixel locations on said portion of said print surface so as to selectively form one or more holes in said piece of media at a second set of pixel locations; and repeating the steps of passing ink ejection nozzles and directing laser light such that a printed design is progressively formed on said media with sequential passes of said ink ejection nozzles and such that said holes join to produce a substantially continuous cut boundary circumscribing said pre-defined shape, whereby a printed product having said pre-defined shape is separated from the remainder of said media during the printing process.

* * * * *